Dec. 16, 1969  N. A. FORAN ET AL  3,483,854
COMPRESSED GAS EXPANDER COOLING APPARATUS
Filed May 24, 1968  2 Sheets-Sheet 1

NICHOLAS A. FORAN
JAMES R. COLLINGWOOD
INVENTORS

BY Daniel H. Bobis
Atty

United States Patent Office 3,483,854
Patented Dec. 16, 1969

3,483,854
COMPRESSED GAS EXPANDER COOLING APPARATUS
Nicholas A. Foran, Berkeley Heights, N.J., and James R. Collingwood, Buffalo, N.Y., assignors to Worthington Corporation, Harrison, N.J., a corporation of Delaware
Filed May 24, 1968, Ser. No. 731,926
Int. Cl. F02b *33/00*
U.S. Cl. 123—119                                              12 Claims

ABSTRACT OF THE DISCLOSURE

A system and apparatus for cooling the intake air of an internal combustion engine preferably but not essentially where such engine is driving a compressor wherein compressed gas or a portion of the gas being compressed by the compressor is expanded to cool the same and the cooled gas is passed through a first heat transfer means to cool an intermediate fluid which in turn is passed through a second heat transfer means for cooling the intake air passing to the internal combustion engine.

BACKGROUND OF THE INVENTION

Figure 1:
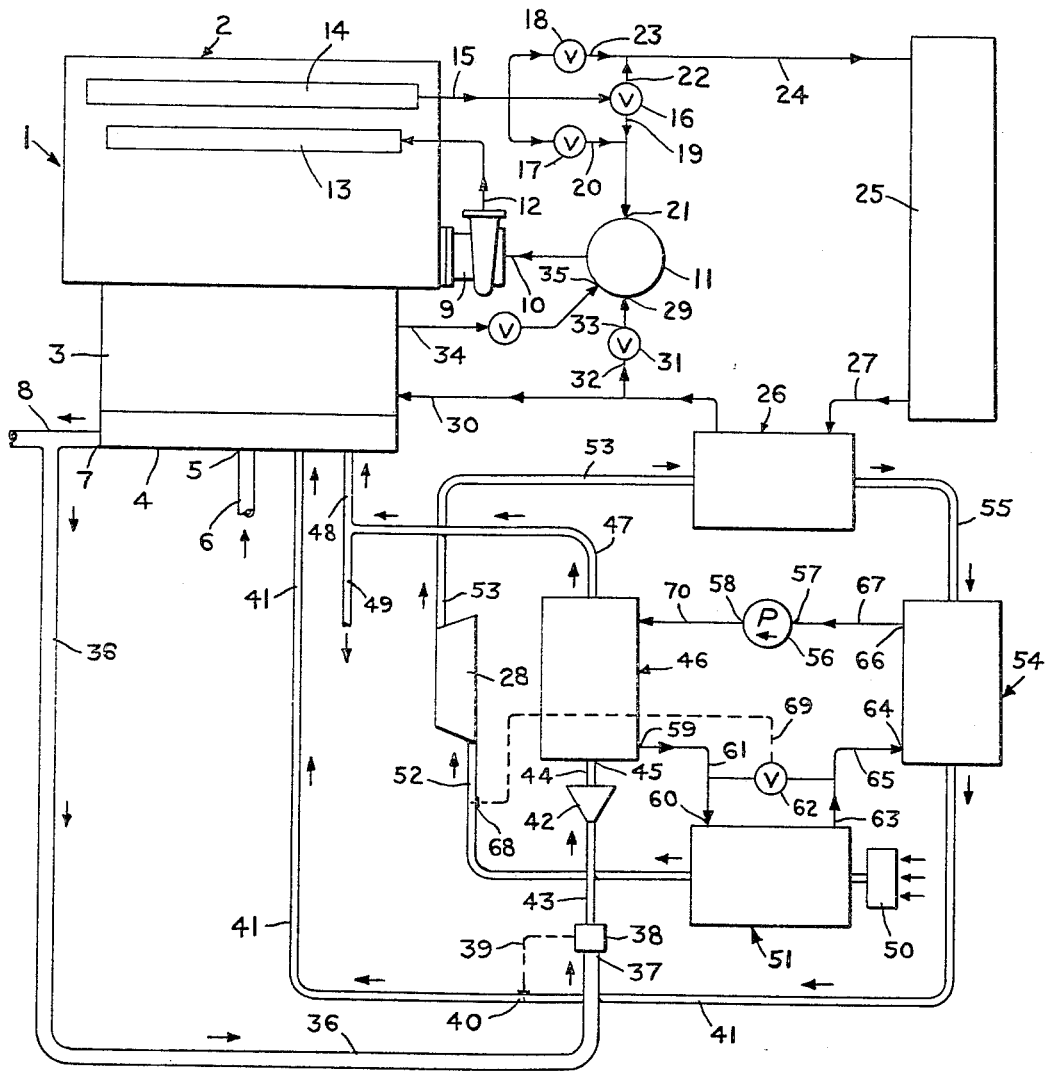

This invention relates preferably to internal combustion gas engine driven gas compressor stations and more particularly to an effective means for cooling and controlling the temperature of the engine intake air.

Compressor stations of this type are often located in geographical areas where high ambient temperatures occur and in naturally aspirated, turbo-charged, or super-charged engines detonation problems arise when operating at ambient temperatures for example, in excess of 100° to 120° F. This occurs because the initially high temperature of the intake air rises after it enters the engine intake manifold and during compression, this causes an overheated condition in the engine cylinders and at the end of the engine cylinder compression stroke detonation will occur under these conditions.

Operation under these conditions for lengthy periods causes the engine to become undependable, subject to excess wear, objectionable vibration, internal shock loads, and other damage.

Further, high ambient air temperature has a low air density which in turn reduces the weight of air which can be forced into a naturally aspirated or super-charged engine and the resulting modification to the fuel/air weight ratio will also reduce the operating efficiency of the engine.

PRIOR ART

Prior art references are U.S. Patents 2,703,561, 2,392,783 and 2,703,560.

Patent No. 2,703,561 discloses a system wherein air is compressed in a blower, further compressed by a compressor, cooled at constant pressure in an intercooler, expanded and thereby cooled further by a conventional expander and then conveyed to the intake manifold of the engine.

Similarly, Patent No. 2,703,560 discloses a means for cooling engine intake air employing a compressor, booster, intercooler and an expander.

Patent No. 2,392,783 discloses means for cooling the jacket water of a gas engine wherein gas is led from the inlet line of a compressor into a gas turbine where the gas pressure is reduced thereby lowering its temperature. The cold gas passes through a heat exchanger in the compressor discharge line thereby partially cooling the compressed gas and then passes to a water cooler where the engine jacket water is cooled.

The prior art noted above does not teach the use of an intermediate closed fluid loop for cooling the engine intake air wherein the fluid in the closed loop is cooled by expanded gas.

Further, the prior art does not teach means of controlling the temperature of the engine intake air within predetermined limits as does the present invention.

The present invention eliminates the need for air compressors, boosters, and intercoolers thereby decreasing or eliminating the sources of mechanical failures and subsequent down time.

SUMMARY

Thus, the present invention covers an effective means for lowering and controlling the temperature of the intake air of an internal combustion engine including a source of compressed gas, means for expanding and thereby cooling a portion of the compressed gas, heat exchange means in which the expanded gas serves as a heat transfer medium in non-contacting heat transfer relationship with an intermediate fluid flowing in a closed loop, a plurality of heat exchange means in which the intermediate fluid serves as a heat transfer medium in non-contacting heat transfer relationship with the engine intake air, and an after-cooler means in which water from the gas engine radiator serves as a heat transfer medium in non-contacting heat transfer relationship with the engine intake air.

Accordingly, it is an object of this invention to provide an economical, convenient means for cooling the engine intake air.

Another object of the invention is to provide a means for controlling the temperature of the engine intake air within predetermined limits.

Another object of the invention is to decrease the chance of detonation in the engine cylinders at the end of the compression stroke caused by an overheated intake air condition.

Still another object of the invention is to decrease objectionable vibration and internal shock loads in the engine.

A further object of the invention is to increase the operating efficiency of the engine.

The above and other objects and advantages of the invention are believed made clear by the following description thereof taken in conjunction with the accompanying detailed drawings.

IN THE DRAWINGS

Figure 2:
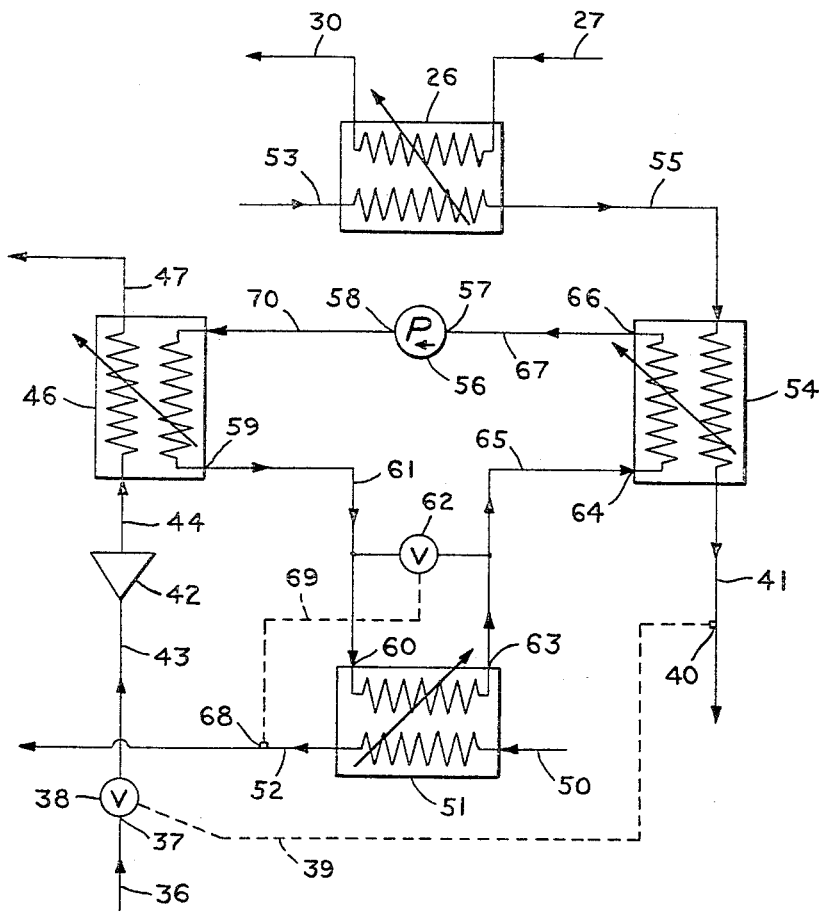

FIGURE 1 is a schematic diagram of an internal combustion engine-compressor combination for compressing gas in a gas pipe line compressor station including the engine-compressor cooling system, and the gas expansion means and heat exchange means for cooling the engine intake air made in accordance with the present invention, and FIGURE 2 is a flow diagram of the intake air cooling system of FIGURE 1.

Referring now to FIGURE 1, an internal combustion engine-compressor system 1 is generally indicated and includes in the preferred form of this invention a gas operated internal combustion engine 2 fitted in the usual manner with a compressor 3 having cylinders 4 for compressing gas flowing in a gas pipe line system. Gas enters the compressor at inlet 5 from the connecting inlet conduit 6 communicating with the pipe line source of gas (not shown) and, after one or more stages of compression, exits through discharge outlet 7 connected to the connecting outlet conduit 8 which leads to the pipe line (not shown) at a higher temperature and pressure.

The operation of compressing gas in an engine-compressor will be familiar to those skilled in this art and will need no further explanation.

ENGINE-COMPRESSOR COOLING SYSTEM

Fluid for cooling internal combustion engine 2 and cylinders 4 of the compressor 3 is circulated by means of a standard circulating pump such as indicated at 9 having its suction side in communication with a surge tank 11 and its discharge side 12 in communication with engine cooling fluid intake manifold 13.

After circulating through and cooling the engine the coolant fluid is discharged from the engine through an engine cooling fluid discharge manifold 14 and into a trifurcated discharge line 15 operatively associated therewith and having its three branches in communication respectively with the inlet of a proportioning valve 16, a fixed manual bypass valve 17 and a lightload bypass valve 18.

One outlet 19 of proportioning valve 16 and the outlet 20 of bypass valve 17 are in communication with one inlet 21 of surge tank 11, and, similarly, a second outlet 22 of proportioning valve 16 and the outlet 23 of bypass valve 18 are in communication with the inlet 24 of a radiator 25 whose function is to cool that portion of the fluid which is not returned to the surge tank 11. Thus, depending on the operating load of the engine, a portion of the cooling fluid after leaving the engine cooling fluid discharge manifold 14 is returned to the radiator 25 with the balance entering the surge tank 11 for recirculation to the engine 2.

After circulating through and being cooled in radiator 25 the cooling fluid enters a conventional aftercooler 26 through a conduit 27 operatively associated therewith and is in a non-contacting heat transfer relationship with air discharging from a turbo-blower 28 for purposes to be more fully described below.

After passing through aftercooler 26, the cooling fluid is proportioned between a second inlet 29 of surge tank 11 and a cooling fluid inlet 30 of compressor cylinders 4 by a proportioning valve 31 having its inlet 32 in communication with the outlet of after-cooler 26 and its outlet 33 in communication with surge tank 11.

The cooling fluid, after circulating through and cooling the compressor cylinders 4 is discharged through conduit 34 to a third inlet 35 of surge tank 11 for recirculation through the engine.

What has thus far been described is a standard, closed loop, fluid cooling system for an engine-compressor comprising a circulating pump, surge tank, radiator, after cooler and a plurality of valves. This system of cooling an engine-compressor system will be familiar to those skilled in this art and will need no further explanation.

ENGINE/FUEL GAS SYSTEM

A ready supply of fuel/gas for burning in the engine is available in the system since the compressor cylinders 4 operate to compress gas as a primary function of the system.

Gas enters the inlet of the compressor cylinders 4 at 5 and after one or more stages of compression exits at 7 at a higher pressure and temperature and then passes into an aftercooler and scrubber (not shown).

Gas, at the higher pressure and temperature is taken from the compressor discharge line downstream of the aftercooler and scrubber through a conduit 36 operatively associated therewith and led to the inlet 37 of a temperature responsive, fuel flow control valve 38 which in turn is operatively associated with a control valve actuator means 39. A temperature sensing probe 40 in communication with the engine intake air manifold 41 senses the temperature of the engine intake air and sends a signal to control valve actuator means 39 operatively associated therewith which in turn opens or closes the control valve 38 in response thereto to allow more or less flow of compressed gas therethrough. Thus, it is seen that the amount of compressed gas taken from the compressor discharge and led to the fuel flow control valve means 38 is dependent upon and is controlled by the temperature of the engine intake air.

After leaving the control valve 38, the high pressure, high temperature gas enters a gas expansion means 42 having an inlet 43 operatively associated therewith and an outlet 44 in communication with a gas inlet 45 of a heat exchange means 46, where the gas is expanded in volume, reduced in pressure, and therefore reduced in temperature in accordance with well known principles of thermo-dynamics.

The expanded, low pressure, low temperature gas after leaving the outlet 44 of the expansion means 42 enters heat exchange means 46 where it is in a non-contacting heat transfer relationship with a higher temperature fluid flowing in a closed loop as will be more fully described below.

Thus, by absorbing heat from the higher temperature fluid, the expanded, low temperature gas is heated while the fluid flowing in the closed loop is cooled.

After flowing through heat exchange means 46 and absorbing heat from the higher temperature fluid, the gas enters a conduit 47 operatively associated at one end with the heat exchange means 46 at the other end with engine fuel gas intake line 48 and gas reutrn line 49. The gas intake line 48 in turn is operatively associated at its other end with the internal combustion engine 2 where the gas is compressed and burned for driving the engine as will be familiar to those skilled in this art.

Gas return line 49 is operatively associated at its other end (not shown) with the inlet 5 of the compressor 3 for recirculating that portion of the expanded gas not burned in the engine cylinders back through the gas pipe line compressor system.

Thus it is seen that gas, which has been compressed as a normal function of a gas pipe line system, is expanded and thereby cooled and used as a heat exchange medium to cool a fluid in non-contacting relation therewith and the expanded gas is then used as a fuel in the engine cylinders or returned to the inlet of the compressor cylinders where it is again compressed.

This cooled fluid is used to cool and regulate the temperature of intake air for the engine 2 as will now be described.

ENGINE INTAKE AIR

Air normally at high ambient temperature for mixing with the fuel gas in the engine cylinders, is drawn into this system through an air filter such as shown at 50 which is in communication with the atmosphere at one end and a heat exchange means 51 at the other end. As the air passes through heat exchange means 51 it is in a non-contacting heat transfer relationship with the fluid flowing in the closed loop as previously mentioned in relation to heat exchange means 46.

The ambient air is thereby cooled and then passes through a conduit 52 connected at one end to heat exchange means 51 and at the other end to turbo-blower 28 where it is compressed and thereby heated.

After being compressed and heated in the turbo-blower 28 the air passes through a conduit 53 connected at one end to turbo-blower 28 and at the other end to aftercooler 26 where the air is in a non-contacting heat transfer relationship with engine cooling fluid circulating therethrough as previously described under "Engine Cooling System." The air is thereby cooled and then passes through a conduit 55 connected at one end to aftercooler 26 and at its other end to heat exchange means 54 where it is cooled further by being in a non-contacting heat transfer relationship with fluid flowing in the closed loop as will be further described below.

After being cooled in heat exchange means 54 the air is transmitted to the engine cylinders through engine intake air manifold 41 connected at one end to heat exchange means 54 and at the other end to internal combustion engine 2.

Thus, by passing through three heat exchange means the normally high ambient temperature of the air is reduced before entering the engine cylinders. The effect of lower air temperatures is to reduce detonation in the engine cylinders during the combustion portion of each cycle. Since detonation is reduced, excessive wear, objectionable vibration, noise, and shock loading are also reduced resulting in more dependable engine operation.

CLOSED LOOP

As previously mentioned in regard to heat exchange means 46, 51, and 54, they each employ as one of their heat exchange media a single fluid which flows in a closed loop comprising; a conduit 61 connecting heat exchange means 46 to heat exchange means 51, a conduit 65 connecting heat exchange means 51 to heat exchange means 54, a bypass valve 62 for diverting a portion of the flow from the exchange means 51 directly to heat exchange means 54, a conduit 67 connecting heat exchange means 54 to the inlet of the circulating pump 56 used as the source of energy for circulating the fluid through the closed fluid loop, and a conduit 70 connecting the discharge of circulating pump 56 to heat exchange means 46 thus completing the loop.

As the fluid flows through heat exchange means 46 it is in a non-contacting heat transfer relationship with the expanded, low temperature gas as previously described and is thereby cooled. The fluid leaves heat exchange means 46 at 59 and enters heat exchange means 51 at 60 through conduit 61 operatively associated therewith or is bypassed through a valve 62 into heat exchange means 54 as will be more fully described below.

In passing through heat exchange means 51 the fluid in the closed loop in a non-contacting heat transfer relationship with ambient air as previously described and is thereby heated while cooling the air.

The fluid leaves heat exchange means 51 at 63 and enters heat exchange means 54 at 64 through conduit 65 operatively associated therewith where it is in a non-contacting heat transfer relationship with the air leaving aftercooler 26 thus further cooling the air and heating the fluid in the closed loop.

To complete the closed loop the fluid leaves heat exchange means 54 at 66 through conduit 67 operatively associated at one end with heat exchange means 54 and at its other end with inlet 57 of the circulating pump 56 for recirculation through the loop.

As mentioned above, a valve 62 is provided at the exit of heat exchange means 46 for bypassing the heat exchange means 51. A probe 68 for sensing the temperature of the intake air in the inlet of the turbo-blower 28 sends a signal to a temperature responsive control 69 operatively associated with valve 62 thereby opening or closing valve 62 to allow more or less fluid in the closed loop to flow through heat exchange means 51. As the temperature of the air at the inlet of turbo-blower 28 increases, the valve 62 is closed allowing more fluid to flow through heat exchange means 51 thereby increasing the cooling effect on the inlet air.

While a system has been described wherein the internal combustion engine is used to drive a gas compressor and the discharge of the gas compressor is used as the source of high pressure gas to be expanded and thereby cooled, it is believed obvious that the engine can be used to drive any load and that another source of compressed gas, such as the compressed air supply system of a factory, could be used as the gas to be expanded and thereby cooled.

It is understood that this invention is not to be limited to the specific construction or arrangement of parts as shown but that they may be widely modified within the invention defined by the claims herein.

What is claimed is:

1. In a system for cooling the intake air of an internal combustion engine, the combination therewith of:
   compressed gas means;
   an expansion means operatively associated with said compressed gas means for expanding and thereby cooling a portion of said compressed gas;
   a first heat exchange means in communication with said expansion means, in which said cooled gas acts as a heat transfer medium in non-contacting heat transfer relationship with an intermediate fluid flowing therethrough;
   fluid cooling means having an inlet in communication with said engine and an outlet in communication with an aftercooler means in which engine cooling fluid after being cooled in said fluid cooling means acts as a heat transfer medium in non-contacting heat transfer relationship with said engine intake air for cooling said intake air;
   a second heat exchange means having an inlet for air in communication with an intake air filter means and an air outlet in communication with means serially connected to said aftercooler means for drawing said intake air into the system, in which said intake air is in a non-contacting heat transfer relationship with and is cooled by said intermediate fluid flowing therethrough;
   a third heat exchanger means, having an air inlet serially connected to said aftercooler means, for receiving said intake air from said aftercooler means, for cooling said intake air in a non-contacting heat transfer relationship with said intermediate fluid flowing therethrough;
   intake air manifold means for rceiving said intake air from said third heat exchange means and conveying it to said engine;
   a plurality of conduits operatively associated with said first heat exchange means, said second heat exchange means, and said third heat exchange means for circulating said intermediate fluid in a closed loop through said first, second and third heat exchange means; and
   circulating means for circulating said intermediate fluid in a closed loop through said first heat exchange means, said second heat exchange means, and said third heat exchange means.

2. The combination of claim 1 including a flow control means having an inlet operatively associated with said compressed gas means and an outlet operatively associated with an inlet of said expansion means for controlling the quantity of compressed gas flowing through said expansion means.

3. The combination of claim 2 including a temperature sensing means operatively associated at one end with said intake air manifold means for sensing the temperature therein and at the other end with a flow control actuator means operatively associated with said flow control means for opening and closing said flow control means in response to the temperature in said intake air manifold.

4. The combination of claim 1 including a bypass means having an inlet operatively associated with said first heat exchange means and an outlet operatively associated with said third heat exchange means for diverting a portion of said intermediate fluid from flowing through said second heat exchange means.

5. The combination of claim 4 including a temperature sensing means operatively associated at one end with an inlet of said means for drawing said intake air into the system, for sensing the temperature therein, and at the other end with a bypass control means operatively associated with said bypass means for opening and closing said bypass means in response to the temperature in said means for drawing said intake air into the system.

6. The combination of claim 5 including a flow control means having an inlet operatively associated with said compressed gas means and an outlet operatively associated with an inlet of said expansion means for controlling the quantity of said compressed gas flowing through said expansion means.

7. The combination of claim 6 including a temperature sensing means operatively associated at one end with said intake air manifold means for sensing the temperature therein and at the other end with a flow control actuator means operatively associated with said flow control means for opening and closing said flow control means in response to the temperature in said intake air manifold.

8. In a compressor station of a gas transmission pipe line system wherein an internal combustion engine is used to drive a compressor for compressing gas for further transmission through the gas pipe line system, the combination with said internal combustion engine of:

an expansion means operatively associated with the discharge of said gas compressor for expanding and thereby cooling the portion of the gas compressed by said gas compressor;

a first heat exchange means in communication with said expansion means, in which said cooled gas acts as a heat transfer medium in noncontacting heat transfer relationship with an intermediate fluid flowing therethrough;

fluid cooling means having an inlet in communication with said engine and an outlet in communication with an aftercooler means in which cooling fluid, after being cooled in said fluid cooling means, acts as a heat transfer medium in non-contacting heat transfer relationship with engine intake air for cooling said intake air;

a second heat exchange means having an inlet for air in communication with an intake air filter means and an air outlet in communication with means serially connected to said aftercooler means for drawing said intake air into the system, in which said intake air is in a non-contacting heat transfer relationship with and is cooled by said intermediate fluid flowing therethrough;

a third heat exchange means, having an air inlet serially connected to said aftercooler means, for receiving said intake air from said aftercooler means, for cooling said intake air in a non-contacting heat transfer relationship with said intermediate fluid flowing therethrough;

intake air manifold means for receiving said intake air from said third heat exchange means and conveying it to said engine;

a plurality of conduits operatively associated with said first heat exchange means, said second heat exchange means, and said third heat exchange means for circulating said intermediate fluid in a closed loop through said first, second, and third heat exchange means; and circulating means for circulating said intermediate fluid in a closed loop through said first heat exchange means, said second heat exchange means, and said third exchange means.

9. The combination of claim 8 including a flow control means having an inlet operatively associated with the discharge of said gas compressor and an outlet operatively associated with an inlet of said expansion means for controlling the quantity of compressed gas flowing through said expansion means.

10. The combination of claim 9 including a temperature sensing means operatively associated at one end with said intake air manifold means for sensing the temperature therein and at the other end with a flow control actuator means operatively associated with said flow control means for opening and closing said flow control means in response to the temperature in said intake air manifold.

11. The combination of claim 10 including a bypass means having an inlet operatively associated with said first heat exchange means and an outlet operatively associated with said third heat exchange means for diverting a portion of said intermediate fluid from flowing through said second heat exchange means.

12. The combination of claim 11 including a temperature sensing means operatively associated at one end with an inlet of said means for drawing said intake air into the system, for sensing the temperature therein, and to the other end with a bypass control means operatively associated with said bypass means for opening and closing said bypass means in response to the temperature in said means for drawing said intake air into the system.

References Cited

UNITED STATES PATENTS

| | | | |
|---|---|---|---|
| 2,392,783 | 1/1946 | Stevens | 62—323 |
| 2,703,560 | 3/1955 | Lieberherr | 123—119 |
| 2,703,561 | 3/1955 | Froehlich | 123—119 |
| 3,143,103 | 8/1964 | Zuhn | 123—119 |
| 3,209,551 | 10/1965 | Jentet | 62—323 XR |
| 3,229,456 | 1/1966 | Gratzmuller | 60—13 |
| 3,306,032 | 2/1967 | Chaffiotte | 60—13 |

WENDELL E. BURNS, Primary Examiner

U.S. Cl. X.R.

60—13; 62—323; 123—27, 41.31; 230—56